United States Patent
Govan et al.

(10) Patent No.: US 10,868,888 B1
(45) Date of Patent: Dec. 15, 2020

(54) METHOD AND APPARATUS FOR REAL-TIME PERSONALIZATION

(71) Applicant: Zeta Global Corp., New York, NY (US)

(72) Inventors: Barney Govan, Walnut Creek, CA (US); Wynn Vonnegut, San Francisco, CA (US); Christian Monberg, San Francisco, CA (US)

(*) Notice: Subject to any disclaimer, the term of this patent is extended or adjusted under 35 U.S.C. 154(b) by 13 days.

(21) Appl. No.: 16/256,651

(22) Filed: Jan. 24, 2019

Related U.S. Application Data

(62) Division of application No. 15/367,579, filed on Dec. 2, 2016.

(60) Provisional application No. 62/262,273, filed on Dec. 2, 2015.

(51) Int. Cl.
| | | |
|---|---|---|
| *G06F 15/16* | (2006.01) | |
| *H04L 29/08* | (2006.01) | |
| *G06F 9/54* | (2006.01) | |

(52) U.S. Cl.
CPC ............ *H04L 67/327* (2013.01); *G06F 9/541* (2013.01)

(58) Field of Classification Search
CPC ....... H04L 67/327; H04L 67/32; H04L 67/20; H04L 67/26; H04L 43/04; G06F 9/541; G06F 9/54
USPC ................................. 709/202–203, 217–219
See application file for complete search history.

(56) References Cited

U.S. PATENT DOCUMENTS

| | | | |
|---|---|---|---|
| 8,019,777 B2 * | 9/2011 | Hauser | H04L 67/306 707/769 |
| 8,069,099 B2 * | 11/2011 | Chan | G06Q 30/0241 709/203 |
| 8,788,586 B1 | 7/2014 | Vandehey et al. | |
| 8,812,647 B1 | 8/2014 | Jain et al. | |
| 8,990,352 B1 | 3/2015 | Kosslyn et al. | |
| 9,087,035 B1 | 7/2015 | Bandaru et al. | |
| 9,565,078 B1 * | 2/2017 | Smith | H04L 67/327 |
| 9,721,035 B2 * | 8/2017 | Fink | G06F 17/30905 |
| 9,898,466 B2 * | 2/2018 | Cao | H04L 67/22 |

(Continued)

OTHER PUBLICATIONS

"U.S. Appl. No. 15/367,579, Advisory Action dated Dec. 12, 2019", 2 pgs.

(Continued)

*Primary Examiner* — Bharat Barot
(74) *Attorney, Agent, or Firm* — Candice Osnato, Esq.; Piers Blewett; Aaron Wininger

(57) ABSTRACT

In some examples, a computer-implemented method for generating content recommendations for content items is provided. Each content item is associated with one of a plurality of customers. An example method may include receiving a content request from a requesting user, the content request comprising a user identifier and a customer identifier, and retrieving request parameters from a computer-implemented parameter service, the request parameters comprising indicia of one or more recommendation strategies, and parameters for the recommendation strategies. The method may also include retrieving user data comprising a set of indicia of recommendable resources associated with the customer identifier, and routing the content request, request parameters and user data to a plurality of computer-implemented scorers, each scorer generating a recommendation score for each recommendable resource.

18 Claims, 10 Drawing Sheets

(56) References Cited

U.S. PATENT DOCUMENTS

| | | | |
|---|---|---|---|
| 9,922,360 B2* | 3/2018 | Hendrick | ............ G06Q 30/0631 |
| 10,673,964 B2* | 6/2020 | Lewis | ..................... H04L 67/20 |
| 2002/0112035 A1 | 8/2002 | Carey et al. | |
| 2006/0271548 A1 | 11/2006 | Maes | |
| 2008/0027924 A1 | 1/2008 | Hamilton et al. | |
| 2009/0112832 A1 | 4/2009 | Kandogan et al. | |
| 2009/0177754 A1 | 7/2009 | Brezina | |
| 2010/0169873 A1 | 7/2010 | Laicher et al. | |
| 2011/0066497 A1 | 3/2011 | Gopinath et al. | |
| 2011/0125578 A1 | 5/2011 | Alspector et al. | |
| 2011/0167360 A1 | 7/2011 | Aitken et al. | |
| 2011/0320307 A1 | 12/2011 | Mehta et al. | |
| 2012/0110077 A1 | 5/2012 | Merchant et al. | |
| 2012/0290434 A1 | 11/2012 | Moritz et al. | |
| 2013/0006967 A1 | 1/2013 | Beringer et al. | |
| 2013/0117367 A1* | 5/2013 | Murakami | .............. H04L 67/22 709/204 |
| 2013/0185106 A1 | 7/2013 | Donatone et al. | |
| 2013/0198005 A1* | 8/2013 | Xiong | .............. H04N 21/23424 709/219 |
| 2014/0012982 A1 | 1/2014 | Li | |
| 2014/0351002 A1 | 11/2014 | Pessis et al. | |
| 2015/0310481 A1 | 10/2015 | Brown et al. | |
| 2015/0347578 A1 | 12/2015 | Tsai et al. | |
| 2015/0347593 A1 | 12/2015 | Tsai et al. | |
| 2016/0021037 A1 | 1/2016 | Hewitt et al. | |
| 2020/0089724 A1* | 3/2020 | Zimovnov | ............ H04L 67/303 |

OTHER PUBLICATIONS

"U.S. Appl. No. 15/367,579, Final Office Action dated Nov. 15, 2019", 13 pgs.

"U.S. Appl. No. 15/367,579. Response filed Nov. 27, 2019 to to Final Office Action dated Nov. 15, 2019", 8 pgs.

"U.S. Appl. No. 15/367,579, Non Final Office Action dated May 2, 2019", 12 pgs.

"U.S. Appl. No. 15/367,579, Preliminary Amendment filed Mar. 27, 2017", 9 pgs.

"U.S. Appl. No. 15/367,579, Response filed Jan. 24, 2019 to Restriction Requirement dated Jan. 4, 2019", 6 pgs.

"U.S. Appl. No. 15/367,579, Response filed Aug. 2, 2019 to Non-Final Office Action dated May 2, 2019", 12 pgs.

Ho, Ricky, "Optimizing Recommendation Systems: Exploration and Exploitation", DZone Big Data, published at https://dzone.com/articles/optimizing-recommendation, (Oct. 10, 2013), 7 pgs.

U.S. Appl. No. 15/367,579, filed Dec. 2, 2016, Method and Apparatus for Real-Time Personalization.

* cited by examiner

METHOD AND APPARATUS FOR REAL-TIME PERSONALIZATION

CROSS-REFERENCE TO RELATED APPLICATION

This application is a division of U.S. patent application Ser. No. 15/367,579, filed on Dec. 2, 2016, which application claims priority to U.S. Provisional Patent Application Ser. No. 62/262,273 filed on Dec. 2, 2015, which applications and publications are incorporated herein by reference in their entirety.

TECHNICAL FIELD

The present disclosure relates in general to data processing systems, and in particular to systems and methods for real-time personalization of content presentation.

BACKGROUND

Users of Internet services can be presented with display pages, such as web pages or email messages rendered by an email client, which are transmitted via the Internet from a content originator to a recipient. One form of Internet service that has become particularly popular is email, enabling a sender to generate and transmit messages to a recipient's server for downloading and review by the recipient at their convenience. Another form of Internet service that has become particularly popular is e-commerce web sites, via which individuals can learn about and procure products and services. Yet another form of Internet service that has become particularly popular is content publication web sites, via which users can consume informational content of interest to them (such as articles, photographs and video). In recent years, these types of Internet services have become primary methods by which individuals shop for goods and services, and consume informational content.

In some cases, Internet-based services may use information about the recipient to personalize the content or appearance of display pages that are presented. Several mechanisms have been developed to accomplish such personalization, including mechanisms to recommend content or products that are believed to be of interest to a viewer based on the viewer's past activities or behavior. For example, an e-commerce site may personalize its home page to highlight items for sale at which the viewing customer has recently reviewed. A content publisher may allow a viewer to configure a preferred category of content, which is then displayed to the viewer immediately on their "home page" view of a content site.

Existing content personalization models present participants and system designers with a number of challenges. For example, in order to maximize effectiveness, personalization systems are often highly-customized to a particular application. Data inputs from different companies are often unique. They may have differing content, and different types of data may have different reliability or quality. Analyzing diverse data traditionally requires a combination of offline model building, iterative learning and taking real-time behavior into account. As a result, solutions are typically highly application-specific, requiring significant technical expertise to implement, as well as significant investment of time and cost in development efforts.

Providing a personalization platform suitable for use as a service, with limited customer-specific development effort, may be desirable to improve access to, and functionality of, personalization effects.

SUMMARY

The present disclosure describes systems and methods for real-time content personalization. In accordance with one aspect, a dynamic personalization platform is provided, which interprets user behavior and attributes along with the content users are interacting with, to implement optimized predictive models of what content they'll want to see next. In some embodiments, the platform may also automatically select different recommendation strategies, on a request-by-request basis rather than a per-user and/or per-customer basis. Those predictive models can be utilized to personalize content in one or more environments, including email, mobile and applications, and across many different businesses in many different industry sectors.

An extensible and highly flexible framework can be implemented to meet unique business needs with a general purpose platform. In some embodiments, when calculating for a single user, recent behavior is scored against an ensemble of analytic models and the totals are amalgamated into a final recommendation. In some embodiments, user behavior may be scored against a dynamic mixture of ensembles of analytic models, varying across customer and having temporal variation too. Any combination of analytic models may be explored and tested in a multivariate framework on this final ranking function. Models may be added and removed on a per-application basis. The combinations may be evaluated dynamically, even, e.g., during the course of a single email blast, or during the course of a single web session. This evaluation may be performed simultaneously across all businesses using the system. Online learning and optimization systems, such as machine learning modules, may be applied to continually optimize model selection, weighting and combination.

Various other objects, features, aspects, and advantages of the present invention and embodiments will become more apparent from the following detailed description of preferred embodiments, along with the accompanying drawings in which like numerals represent like components.

DETAILED DESCRIPTION

Figure 1:
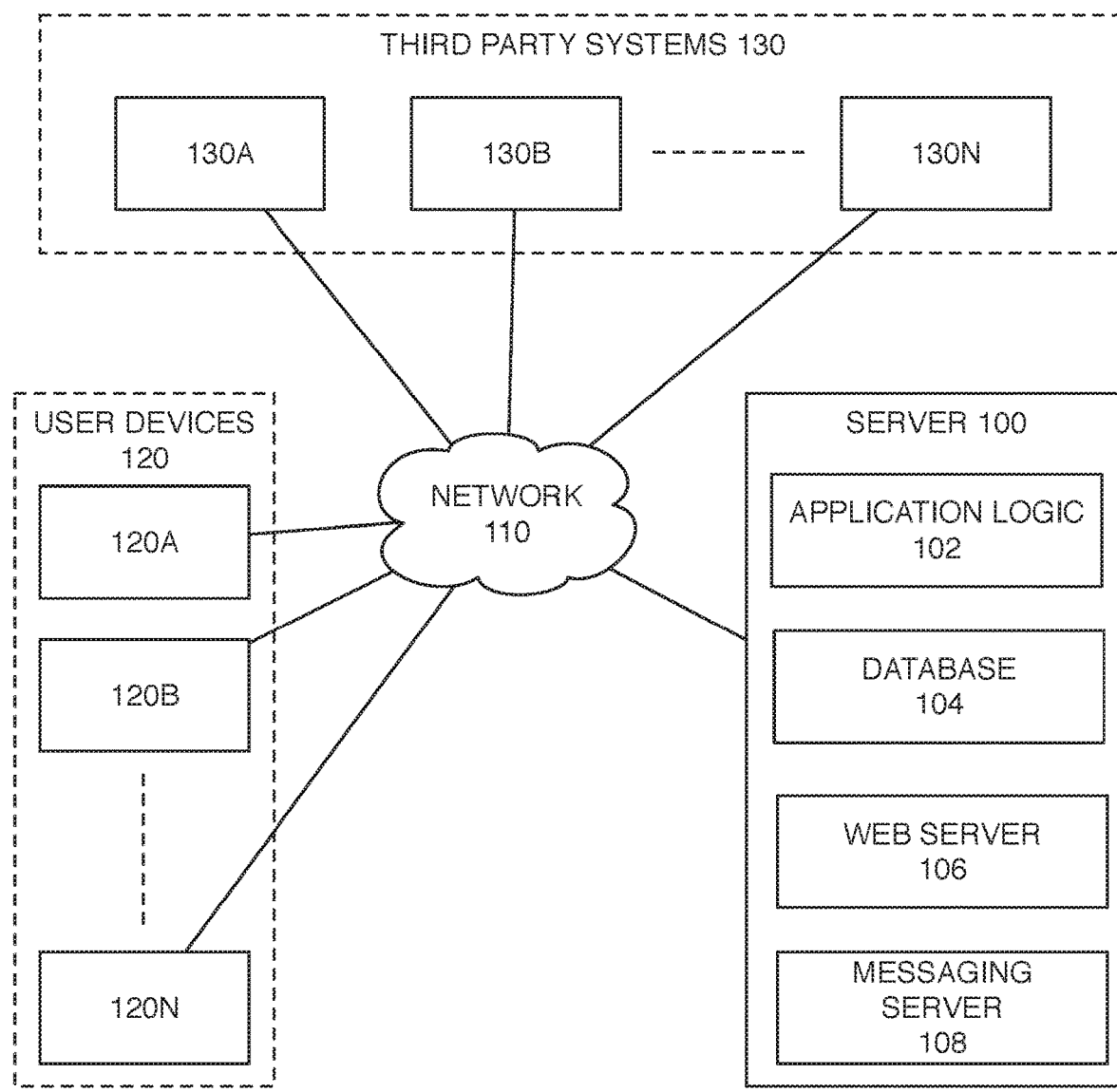
FIG. 1 is a schematic block diagram of a computing environment with content personalization system.

While this invention is susceptible to embodiment in many different forms, there are shown in the drawings and will be described in detail herein several specific embodiments, with the understanding that the present disclosure is to be considered as an exemplification of the principles of the invention to enable any person skilled in the art to make and use the invention, and is not intended to limit the invention to the embodiments illustrated.

Systems and methods described herein may present key attributes and capabilities that help overcome limitations of prior systems to rapidly and accurately personalize content across many different domains.

FIG. 1 is a schematic block diagram of an embodiment of a content personalization system. Server 100 communicates, inter alia, via computer network 110, which may include the Internet, with multiple user devices 120 and multiple third party systems 130. User devices 120 preferably include a number of individual user devices such as a personal computer, tablet computer, smart phone, smart watch, smart appliances, and other such computing devices, which may be used by individuals to access services such as Internet web sites, email, instant messaging, social networking, locally-installed applications and other network-connected services and applications.

Server 100 implements application logic 102, and operates to store information within, and retrieve information from, database 104. The term "database" is used herein broadly to refer to a store of data, whether structured or not, including without limitation relational databases and document databases. Web server 106 hosts one or more Internet web sites and/or APIs enabling outside user interaction with, amongst other things, application logic 102 and database 104. Messaging server 108 enables email and/or instant messaging, such as SMS or MMS communications, between server 100 and user devices 120.

While depicted in the schematic block diagram of FIG. 1 as a block element with specific sub-elements, as known in the art of modern web applications and network services, server 100 may be implemented in a variety of ways, including via distributed hardware resources and using any of multiple different software stacks. Server 100 may include multiple web servers, application servers, database servers, email servers, storage servers, SMS or other instant messaging servers, and the like. That said, the implementation of server 100 will include at some level one or more physical servers, at least one of the physical servers having one or more microprocessors and digital memory for, inter alia, storing instructions which, when executed by the processor, cause the servers to perform methods and operations described herein.

Third party systems 130 include network-connected services and applications, such as web sites, social networking platforms, content publication platforms, ad networks, email servers, and APIs or other interaction interfaces for these and other systems. In some embodiments, one or more of third party systems 130 will be customers of server 100, for which server 100 provides real-time personalization functionality on service basis.

Figure 2:
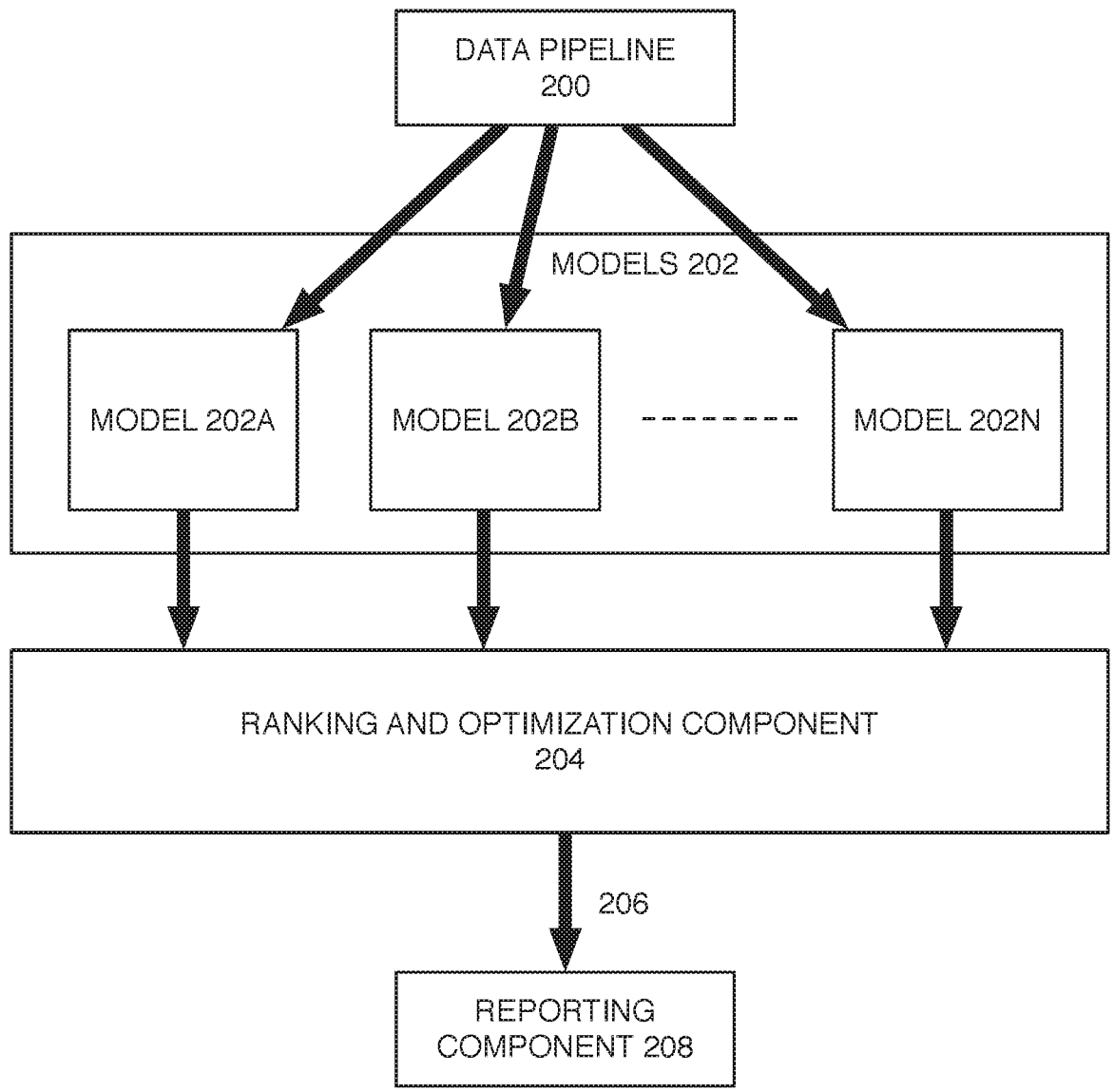
FIG. 2 is a schematic block diagram of a content personalization system.

The communication environment of FIG. 1, with server 100 executing application logic 102, can be utilized to implement real-time personalization services. FIG. 2 illustrates an exemplary embodiment of such a real-time personalization system. At a high level, data pipeline 200 feeds multiple analytic models 202 (e.g. models 202A, 202B et seq.) The outputs of analytic models 202 are fed to ranking and optimization component 204. Ranking and optimization component 204 generates output 206, which is conveyed to reporting component 208. Reporting component 208 can make output 206 available to other internal or external systems, such as one or more of third party systems 130.

Figure 3:
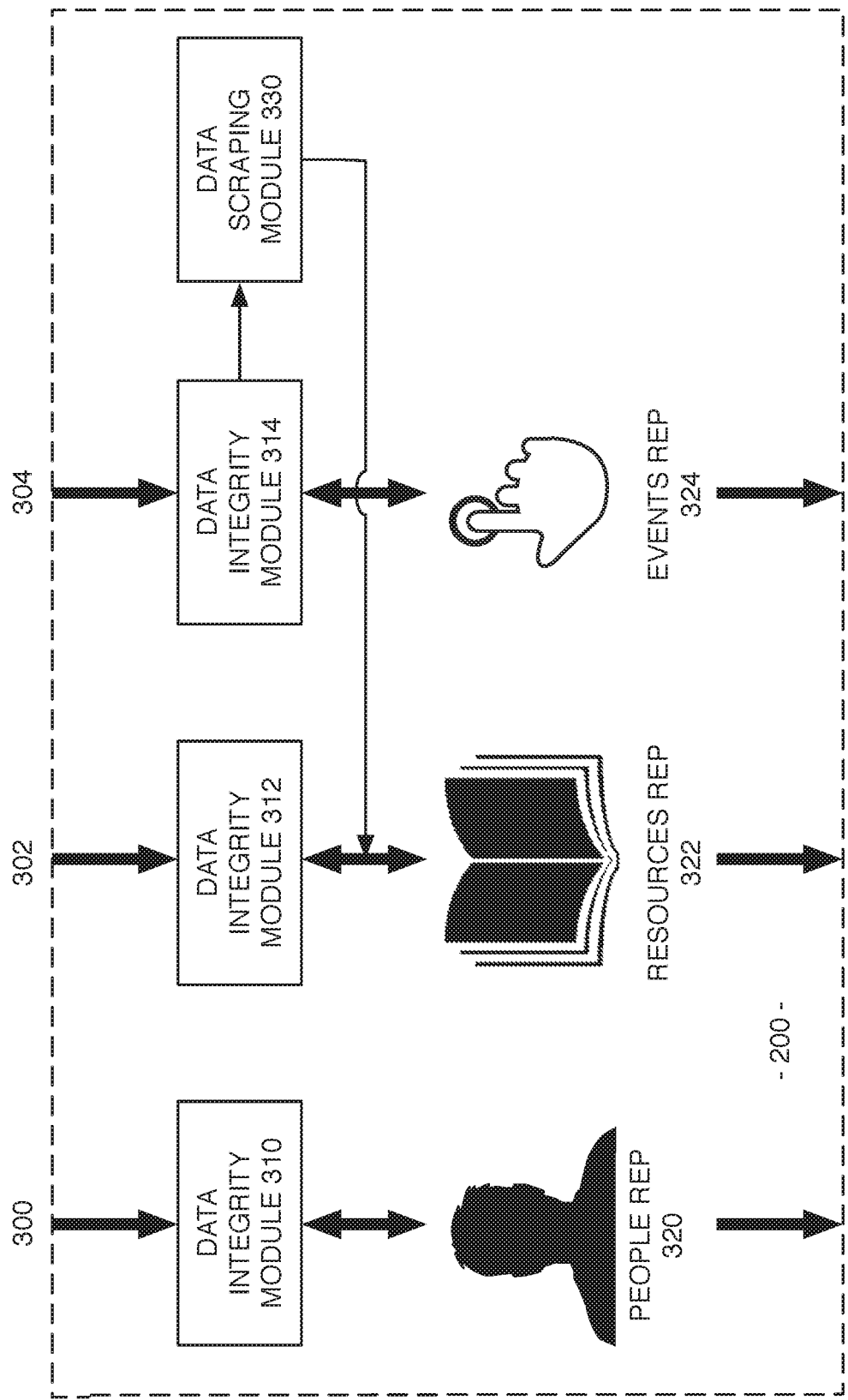
FIG. 3 is a schematic block diagram of a data pipeline.

In an exemplary embodiment, FIG. 3 illustrates further detail of data pipeline 200. Data pipeline 200 performs data ingestion and cleaning operations. In the embodiment of FIG. 3, data pipeline 200 includes three data stream inputs: people stream 300, resources stream 302 and events stream 304. Each input stream contains information from one or more of third party systems 130; amongst the mechanisms through which data can be ingested are API, Javascript methods that are called implicitly or explicitly, and SDK-provided data interchange mechanisms.

Data from people stream 300 feeds people data integrity module 310, which in turn feeds People Repository 320. Similarly, resources data stream 302 feeds data integrity module 312, which in turn feeds Resources Repository 322. Events data stream 304 feeds events data integrity module 314, which in turn feeds Events Repository 324. Repositories 320, 322 and 324 are then made available as output of data pipeline 200, to be queried by one or more models 202.

With personalization systems, data integrity is critical to system performance. Erroneous or malformed data inputs can cause analysis modules to yield suboptimal outputs; in the case of machine learning-based analysis modules, bad input data can further lead to mistraining of a model, potentially yielding a sustained period of suboptimal output. Therefore, data integrity modules 310, 312 and 314 are provided to minimize the passing of invalid data to models 202.

In some embodiments, data integrity modules 310-314 may operate to ensure that fields within data streams 300, 302 and 304 actually look like their intended information type. For example, if a field is called "modification date", modules 310, 312 and 314 may operate to ensure that the associated data content is formatted in a known date-and-time data format prior to passing that data on to models 202. If a field is a URL, modules 310, 312 and 314 preferably ensure that data contents are formatted as URLs prior to passing the data onto models 202.

Each of repositories 320, 322 and 324 contains different types of data. People repository 300 contains certain types of information associated with users. Preferably, People have two sets of attributes: (1) Standard Attributes which are expected to be meaningful for all users (first name, last name, email address, etc.); and (2) Generic User Attributes, which can be optional and/or customized in different uses. Generic User Attributes can be stored within repository 320 as key-value pairs. For example, a customer may wish to track whether a user came in via email list, a particular marketing campaign, organic search, etc.; a key-value pair can be passed indicative of user referral source.

Preferably, each individual within People repository 320 is assigned a unique identifier (e.g. a UUID). The user identifier may be incorporated into a web browser cookie or other tracking mechanism, so that activities can be uniquely associated with a user. To the extent individuals within People repository 320 continue to be associated with a UUID, their activities are effectively anonymous. However, at some point in time, user activities may be associated with a UUID may include reference to a user's personally-identifiable information, such as an email address. In such circumstances, individuals within People repository 320 may be individually identifiable.

Resources repository 322 contains items (or records associated with items) that are subject of recommendation, prediction, selection or other action, by the real time personalization system. In some embodiments, such as many e-commerce applications, resources will be products that are available for promotion or recommendation to a user. In some embodiments, such as many content publication applications, resources will be articles, videos or other content items for recommendation to a user.

In some embodiments, resources repository 322 may apply business rules (both pre-processed and applied in real time) to items in resources repository 322 in order to ensure that only recommendable candidates are returned by data pipeline 200 for the real-time scoring system to evaluate.

Event repository 324 contains actions associated with a user and/or resource. Information within repository 324 may include: a) user history, consisting of user interactions with resources; and b) user profile information containing observed and derived data about each user. Observed user data may include demographic information and/or technographic information (e.g. browser, OS, email address, etc.). Derived user data may include behavioral segments the user falls into or, in the case of missing observations, imputed demographic data. Thus, data associated with a user data is collectively stored within both people repository 320 and event repository 324.

Figure 4:
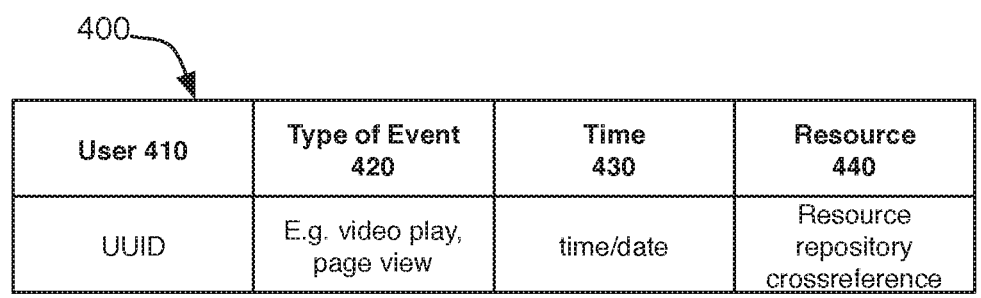
FIG. 4 is an event schema.

Events within repository 324, such as user interactions with resources, are stored having a schema, such as schema 400 illustrated in FIG. 4. Each Event 400 includes a user 410 with whom the event is associated (e.g. a UUID); an Event Type 420 (such as video play, web page view, item purchase, partial page scroll, rating, add to cart); a time and date 430 at which the event took place; and a resource identifier 440 indicating the resource with which the event is associated.

In some embodiments, data integrity validation can be performed by modules 310, 312 and 314 during the ingestion of new data. In other embodiments, data integrity validation may be performed on data already within a repository, such as periodic evaluation of repository content. For example, once a collection of resources is developed within resource repository 322, it may be desirable to test the integrity of the resource collection as a whole. In an e-commerce application in which resources include a collection of items available for sale, it may be desirable to evaluate how many resources share the same title, thumbnail image or URL; in some applications, it may be suspicious if multiple items share identical images or titles. Such integrity checks allow customers to identify and correct such issues before they impact the quality of personalization results.

In some embodiments, a real time personalization service may be implemented having a default, generally-applicable data field schema, but further permitting per-customer customization, such as defining additional data fields. For example, an e-commerce application may include a default "price" field within resource stream 302 and resource repository 322; in such an embodiment, a customer may request an additional "retail price" and field to distinguish within the model between the selling price and the suggested retail price, such that a prediction model can potentially account for, inter alia, individuals motivated to purchase items having a significant discount. In such circumstances, resources data integrity module 312 can be configured to apply data validation to customer-specific data fields as well. For example, in the case of a custom Retail Price field, data integrity module 312 may enforce a data format requirement of a floating point decimal having a maximum of 2 digits right of the decimal point. Such data integrity operations on customer-specific data fields can be preferably customizable on a per customer and per field basis.

One challenge facing real-time personalization platforms is the dynamic, constantly-changing nature of the Internet and customer content. New products are continually introduced, and new content is continually generated. Therefore, some embodiments may include a mechanism to ingest new resources in an automated manner. For example, preferably, resource identifiers within the event stream are uniquely cross-referenced to an item in resources repository 302. However, in some circumstances, an Event may be received referencing a Resource that is not yet populated within Resource Repository 302.

FIG. 3 illustrates a mechanism for addressing such situations. Events data integrity module 314 evaluates events to determine if they relate to a resource within resources repository 322. If not, data scraping module 330 can be called to create a corresponding resource within repository 322. Scraping module 330 further accesses the resource via network 110 in order to obtain information about it, such as metadata, using well-known web scraping techniques. This interaction between data integrity modules, event and resource repositories and the incoming event stream enable dynamic, real-time ingestion of resources, as events come in impacting those resources.

In some embodiments, the integrity of data procured during dynamic resource ingestion can be aided by leveraging structured content associated with scraped resources. In some embodiments, customers will utilize Open Graph meta tags to systematically populate resource information from content accessed via the Internet. For third party systems 130 utilizing server 100 (implementing the real-time personalization platform of FIG. 2), a system 130 may add Open Graph tags to, e.g., web site content, in order to facilitate automated ingestion of new content by data scraping module 330. For example, a customer may utilize the og:title tag to automatically populate a resource title within repository 322 with the og:title tag content. Similarly, some customers may utilize the og:image and og:content tags to automatically populate a resource in repository 322 with image and text description fields. Many site owners already utilize Open Graph tags for search engine optimization and control over social sharing format, minimizing additional work required to automate resource ingestion and improve data integrity.

In some embodiments, one or more of third party systems 130 may not use Open Graph tags. Such sites may use non-standard tags, they may use other conventions for structuring of content items, or they may use Open Graph tags in a manner that is undesirable for automated resource data ingestion. In such circumstances, data scraping module 330 may be configured to utilize different tags or other system content to populate resource metadata within repository 322.

Preferably, events associated with resources not yet populated in repository 322 are not made available for evaluation by models 202 unless and until associated resource data fields are populated. In some embodiments, events relating to unknown resources may be dumped. In some embodiments, events relating to unknown resources may trigger scraping module 330, and are either dumped (if scraping is unsuccessful) or made available for analysis (if scraping successfully populates a corresponding resource). In some embodiments, events relating to unknown resources may be quarantined and made unavailable to models 202 unless and until the corresponding resource is later populated, whether via ingestion by module 330 or otherwise.

In addition to web scraping, other mechanisms can also be provided to populate resources in an automated or semi-automated manner. For example, some content associated with resources may be stored within a database, or a table that is not amenable to scraping. In such circumstances, an API integration may be provided between server 100 and one or more of third party systems 130. Systems 130 can make API calls to server 100 via network 110, in order to transmit new resources and other content items.

Another mechanism that can be provided to ingest new resources in an automated manner is an RSS feed. Third party systems 130 may make content available to server 100 via an RSS feed, which is periodically polled by server 100. A new resource is populated within repository 322 for each new item in the RSS feed. Typically, RSS feed content items are structured as XML files; XML fields within an RSS feed item can be mapped to repository data fields to support data field integrity. Automated ingestion of resources via RSS feed can be beneficial where, for example, a third party system 130 does not provide a web page to scrape (such as a back end server supporting a mobile app), and the customer does not wish to dedicate time or engineering resources to developing an API integration with server 100.

Models

In the embodiment of FIG. 2, an ensemble personalization system provided. The ensemble system of FIG. 2 uses multiple specialized analytic models 202, the results of which are combined by ranking and optimization component 204 to yield result 206. Result 206 can then be reported back to one or more of third party systems 130 by reporting component 208 communicating via network 110, or utilized by other modules or systems, whether integrated with server 100 or otherwise.

In some embodiments, models 202 include various specialized recommenders adapted to effectively attack specific types of personalization scenarios. Ranking and optimization component 204 can then be utilized to intelligently, and potentially dynamically, weight the outputs of models 202 to yield an optimized result. This structure may provide a single personalization platform capable to effectively addressing a diverse variety of personalization tasks and datasets—thereby facilitating a general-purpose, multi-tenant personalization-as-a-service platform rather than requiring custom-designed, application-specific personalization systems. Embodiments may dynamically adapt to individual customers and to individual requests, thereby enabling a common personalization platform to manage personalization for potentially hundreds of separate businesses.

Models 202 may include one or more types of analyses. Examples of models 202 include: behavioral similarity models, content similarity models, user-to-user similarity models, interaction sequence models, time series analysis, real-time mood analysis, vertical specific models and business rule filters. Behavioral similarity models can be configured to analyze people, event and resource data (e.g. data within repositories 320, 322 and 324) in order to predictive what a user is likely to do next based on the behavior of other users that are either similar or are in a related situation (e.g. after watching the movie 'Conan Barbarian', what is the next movie that the user will watch: 'Terminator' or another movie in the same setting or a movie from the same era?).

Content similarity models can be configured to predict what content a user is likely to want to see next, based on prior people, event and resource data. In particular, this approach focuses on predicting how two items are related based on the metadata describing the content or the content itself. Which features are used (i.e. particular metadata and/or content components) and the extent to which they are used is determined based on analyzing customer behavior. A particular subtype of content similarity model that may be useful is a resource-to-resource similarity model, which generates a predictive output based on resource properties, whether intrinsic or extrinsic.

User-to-user similarity models can generate predictive outcomes based on user profile information (intrinsic and extrinsic). Interaction sequence models generate predictive results by evaluating interactions between users and resources (e.g. User A consumes resource 1 then 2 then 3, User B consumes resource 2 then 1 then 3, etc.) Time series analysis evaluates time information associated with resource consumption (e.g. resource A had 100 views in the last hour, resource B had 50 views in the last hour, etc.) Real-time mood analysis can evaluate a user's present intention or state of mind based on real-time event data.

Vertical specific models are based on specific use cases, such as magazines or ecommerce. For example, online magazines suffer from adjacency bias when two items are next to each other; when readers view a first item, at least some of them are are more likely to view a second subsequent, adjacent item simply by virtue of its positional relationship to the first item, rather than a genuine interest of the viewer in the subject matter of the second item. This is preferably accommodated for in collaborative filtering approaches. In another example of vertical-specific modeling, content recommenders typically want to filter out the last item that a user viewed, whereas an ecommerce recommender typically would want to include the last time viewed but not bought.

Further, optimizing for various key performance indicators KPI's will vary from commerce to content. A training system should adapt and respond to the desired business outcome. For example, a recommendation system may be tuned to focus on short term user engagement or long term user engagement. In the former case, the recommender system would be tuned to seek out 'clickbait' titles, in the later case it may be tuned to find articles that get a user to think and then return to the site over and over again. Another example could be tuning a recommendation engine to allow users to discover as many new categories of product as possible thus increasing the 'stickiness' of the site at the expense of short time CTR or to allow users to find items in categories they know about already which may have a higher CTR or provide a better customer experience right now. Regardless, the system may be agnostic to the metric being optimized and, in some embodiments, will be configured to optimize across multiple business metrics.

Business rule filters enable customers to decide what content is included in their personalized results based on their company's unique needs. Business rules are governed by available meta-data associated with content e.g. publication date, or user attributes e.g. location. Two major types of business rules can be provided: global rules and run-time rules. Global rules are applied to all resources for a single business. Run-time rules are applied to a single request, or a set of requests. Such rules or filters may also be mandatory (i.e. never removed), or optional (i.e. the filter or condition may be removed if too few resources pass the filters).

In some embodiments, one or more of models 202 may be based on metadata stored within repositories 320, 322 and/or 324. One such model, sometimes referred to as a "Text" model, is based on resource titles and descriptions. The model incorporates algorithms designed to derive meaning from the text (e.g. intent, topic, related phrases etc), each of these being 'features'. The model then extracts the importance of each feature by observing the behavior of users interacting with these items. The combination of these two sets of data allow recommendation of items that are related to items the user has engaged with, purchased or otherwise interacted in the past.

A model sometimes referred to as "Meta" is based on meta information, such as keywords, categories, author, publication date etc. Similar to the text model, we consider each of these datapoints as 'features'. The model implements an algorithm that extracts the importance of each feature by observing the behavior of users interacting with these items. The combination of these two sets of data allow recommendation of items that are related to items the user has engaged with, purchased or otherwise interacted with in the past.

A model sometimes referred to as "Collab" is based on behavioral data, looking for things that people typically do together (e.g. two items that are commonly purchased together, or an item that is purchased after another item is viewed). For example, in an e-commerce use case, a Collab model may be used to examine co-purchases across users (i.e. items placed in a shopping cart simultaneously or close in time) to predict other items that a particular user may be interested in purchasing. Collab models may also be based on behavioral sequences, user-user similarities, and time-series data, in addition to or in lieu of resource-resource similarities and user-item single interactions.

Many other types of classification models and distance measures may be utilized in some embodiments, such as k-nearest neighbor classification models, neighborhood schemes, and parametric and non-parametric statistical models for determining distance and/or similarities.

In some cases, models, once built, may be implemented as recommenders. For example, if a model predicts that an item X is related to an item Y based on a set of data, a recommender can be implemented by applying the model to items with which a user has recently interacted (item X) to recommend a new item with which they may be interested in interacting (item Y). The recommender may generate a score based on one or more factors, including, without limitation: the strength of correlation between items, and the quality of data.

Ranking and Optimization

Ranking and optimization component 204 generates an ensemble from disparate models 202. Various mechanisms for amalgamating outputs of models 202 can be utilized. In a simplistic example, one or more of the outputs can be averaged. In some embodiments, weighting factors may be applied to each output of models 202.

There are many other possible ensembles that could be chosen from. The particular ensemble (which may be a single recommender or a hybrid recommendation ensemble) may be chosen and parameterized at request time (in real-time) by a dynamic selection mechanism. The selection criteria may be chosen and continually updated by an online learning and optimization system. One particular embodiment of this kind of online learning scheme is a multi-armed bandit where each "arm" is used to select a set of parameters and/or a recommendation strategy. Another embodiment of this is a reinforcement learning system which learns through repeated trial-and-error to select the optimal mixture and/or individual recommendation strategy. Such an online learning system can be highly effective in determining which strategy will perform best for a particular customer at a particular time. This is particularly important because even for a single customer, the optimal recommendation strategies can change based on request time, so having a system that automatically adjusts based on context is important for managing many hundreds of customers.

Several types of weighting can be applied across and within models 202. In some embodiments, weights allow tuning of features within individual models 202. For example, a text recommender model may utilize application-specific weighting to, e.g., identify text components "doctor" and "physician" as being in close proximity for an application in a medical setting, while identifying text components "doctored" and "physician" to be far apart in a fraud setting, discussed further below. Another implementation of weighting allows different hybrid mixtures (where a hybrid is an ensemble of models). Weighting can be applied to mix individual model outputs to provide a better overall result than each individual model. Yet another implementation of weighting can be applied to impact the choice of different hybrids or single models within, e.g., an automated multi-armed bandit or reinforcement learning setting.

Such weighting factors may be determined intuitively, based on a user's beliefs as to which models are likely to be more appropriate for a particular analysis. For example, if a particular customer provided data streams having rich text data, but very limited behavioral data, the customer might deem a Text recommender to be more reliable than a behavioral model recommender, such that a higher weight would be applied to the Text recommender output as compared to the behavioral model output.

More preferably, in some embodiments, some or all types of weighting can be optimized using a computational optimization technique, such as machine learning. Preferably, a machine learning-based ranking and optimization component 204 will be trained with a particular customer's data. In that way if, for example, a customer's data streams feature strong text data and weak or limited behavioral data, a machine-learning based component 204 automatically optimized weights applied when combining outputs of models 202. In this manner, customers using the exact same models and ensemble constituents will typically still achieve different weightings, such that the system overall generates different outputs for a given input. For example, a customer applying the personalization system of FIG. 2 in a medical context might result in an ensemble recommender that treats the terms "doctor" and "physician" as largely interchangeable; while an ensemble recommender in a fraud investigation application might treat "doctored" as wholly different from "doctor", and most certainly unrelated to "physician". As another example, one model (or ensemble of models) may perform well for an ecommerce customer on holiday shopping traffic but not so well for their usual traffic, whereas another model may perform well on the customer's usual traffic but not so well for holiday traffic. In such a case, the platform may learn to preferentially choose the higher performing model (or ensemble) based on the kind of traffic currently being served. While the outputs of such systems may appear to be highly customized to the customer, in reality, general-purpose models have simply been trained with different data.

In some embodiments, a customer will be initially configured with a group of models having equal weightings or random weightings across all of them. In others, data provided by the customer may be used to calculate initial weightings. In still others, a model previously learned for an industry segment the customer belongs to may be used as a basis for the initial model weightings.

In some embodiments, the data is initially made available to all of models 202, and optimization component 204 figures out which models are most effective for a given data stream, adjusting weighting coefficients accordingly. However, in some circumstances, manual intervention may be implemented. For example, pruning of a partially-trained system may be implemented to remove models having particularly low weighting factors, thereby reducing computational load and processing time.

In some embodiments, it may be desirable to allow customers to supplement an ensemble with additional models. Theoretically, if a model is added to an embodiment in which ranking and optimization component 204 is implemented using a machine learning component to optimize weights of models 202, optimization component 204 should evolve to reduce or increase the weighting factor applied to the new model based on its level of effectiveness. However, theoretically there may be circumstances in which adding a new model confuses training and yields negative consequences. Therefore, in some embodiments, new models may be added using an A/B testing process.

Figure 5A:
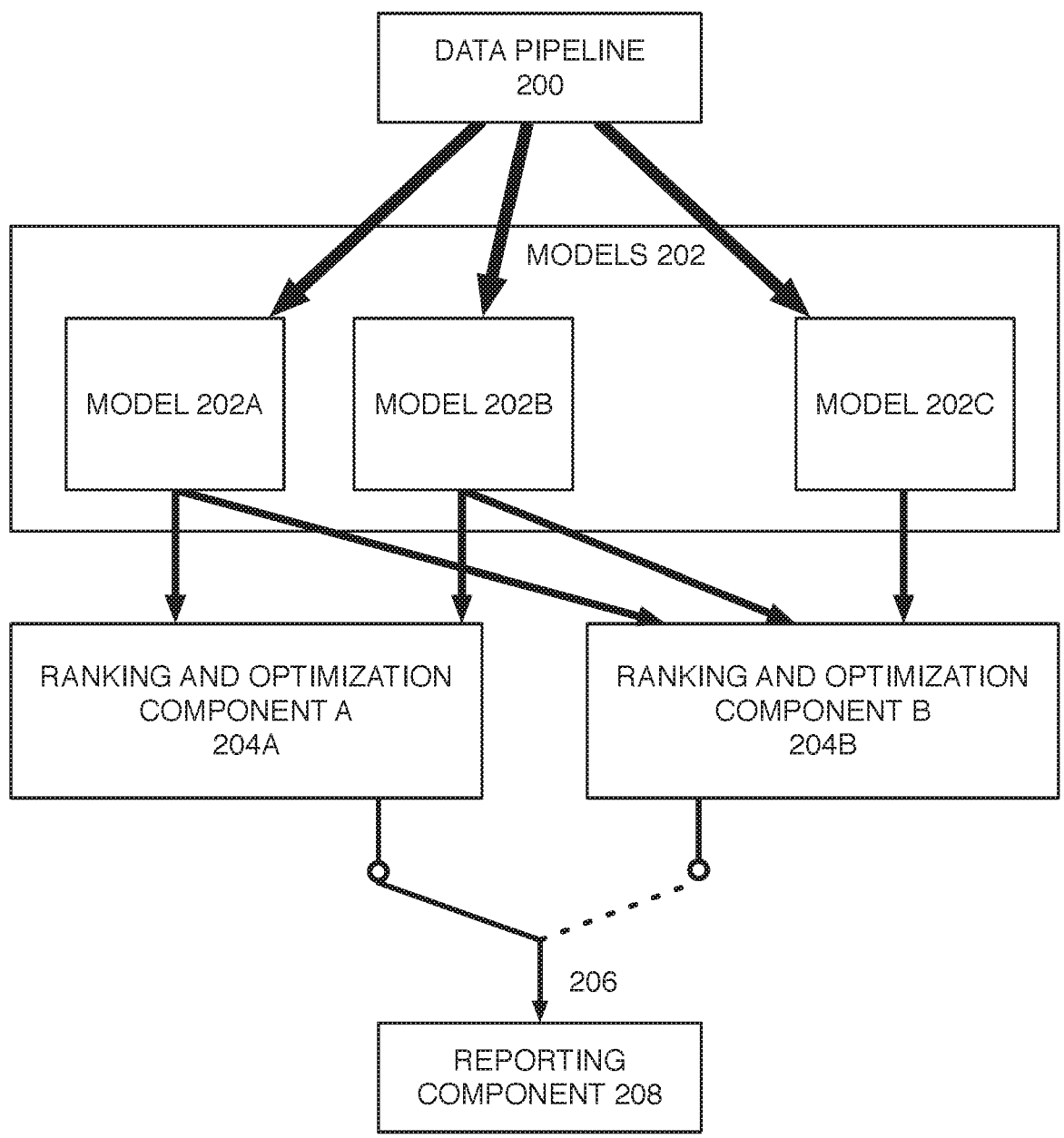
FIG. 5A is a schematic block diagram of another embodiment of a content personalization system.

FIG. 5A illustrates such an embodiment having two models 202A and 202B, in which a third model 2020 is added. Ranking and optimization component 204A operates on the outputs of models 202A and 202B. Simultaneously, ranking and optimization component 204B operates on the outputs of models 202A, 202B and 202C. Ranking and optimization components 204A and 204B are both implemented using supervised machine learning mechanisms. The effectiveness of each of components 204A and 204B is evaluated during continued usage. In some embodiments, reporting component 208 selects the output of component 204A unless and until component 204B displays a higher level of effectiveness, at which point component 204A can be disbanded and the output of component 204B can be selected by reporting component 208. If after a prescribed period of utilization, the output of component 204B fails to demonstrate increased effectiveness relative to component 204A (or an increase in effectiveness by an amount justifying the increased computational cost of implementing model 2020), component 204B and model 2020 can be disbanded, with operation continuing as before.

Figure 5B:
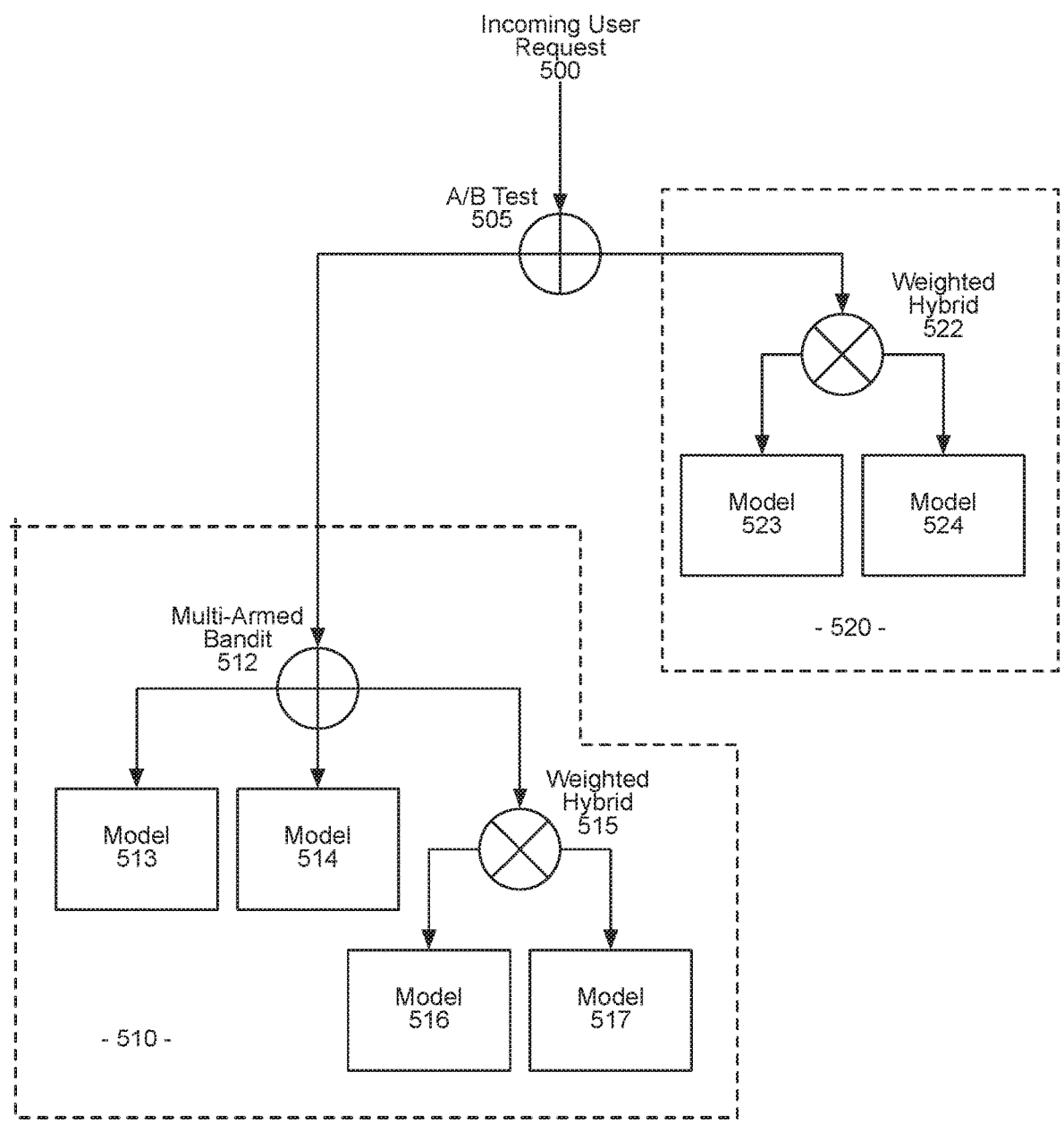
FIG. 5B is a schematic block diagram of a recommender component incorporating A/B testing of models, hybrids or dynamic mixtures thereof.

FIG. 5B illustrates an arrangement incorporating A/B testing, with various ensembles and models. A request for recommendations 500 comes in from a user 120. A/B test component 505 implements a manual experiment, choosing whether to respond to request 500 using production setup 510 or experimental setup 520. Each of setups 510 and 520 could be a single model, a hybrid, or a dynamic mixture (e.g. via multi-armed bandit or reinforcement learning) of single models or hybrids, or any combination of them. The weighting of A/B test component 505 is explicitly set for the manual experiment, such that a specified proportion of requests is sent to either the production setup 510 or the experimental setup 520. In the illustrated embodiment, production setup 510 includes multi-armed bandit 512 feeding model 513, model 514 and/or a weighted hybrid 515 utilizing models 516 and 517. Experimental setup 520 includes weighted hybrid 522 utilizing models 523 and 524.

If production setup 510 is chosen by A/B test 505, multi-armed bandit 512 uses weights to automatically pick one of its three arms, i.e. model 513, model 514 or hybrid 515 (which includes models 516 and 517). If weighted hybrid 522 is chosen, it uses weights to combine the output of all of its two or more parts. The results of requests applied to production model 510 and experimental model 520 will be compared to determine which setup performs best. If experimental setup 520 if chosen, experimental setup 520 can be added into an automatic selection procedure with a uniform, random or pre-learned weighting. The automatic selection procedure will then learn the correct weight for the new setup over time.

In some embodiments, it may be desirable to implement filters in connection with one or more of models 202. One purpose is to limit recommendation outputs to those that suit a particular purpose. For example, a real time personalization service may be utilized to identify a product to be advertised to a user in an email communication using an email template. If the email template includes a product photo, name and description, it may be desirable to limit the recommendation service output to products having fully populated photo, name and description fields.

Another use for filters within models may be to implement desired business rules. For example, a customer may be using the real time personalization service to identify news stories to be presented to users, in connection with a web site having a business model of presenting breaking news to users. The site may determine that it will not present news stories over 24 hours old to users, regardless of how interested the user may be in its content.

In some embodiments, both absolute and preference-based filters may be implemented. Absolute filters are applied without exception (e.g. "do not show any content greater than 24 years old"). Preference-based filters can involve contingencies (e.g. "given a choice of content >24 hours old versus showing nothing, show old content as long as it is <72 hours old").

Figure 6:
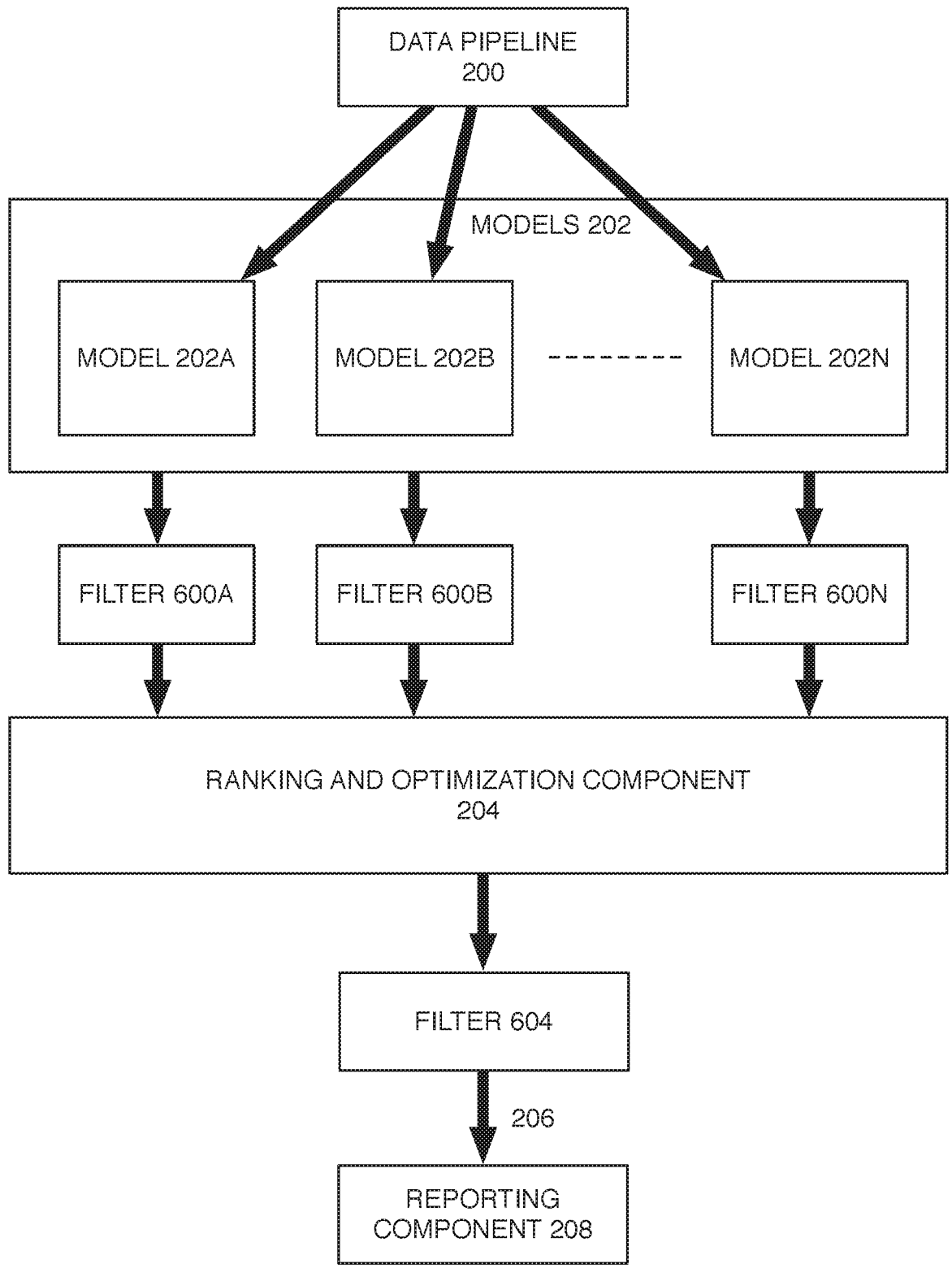
FIG. 6 is a schematic block diagram of another embodiment of a content personalization system.

FIG. 6 illustrates an embodiment implementing filters. Filters 600 are applied to the outputs of one or more of models 202. Filter 604 is applied to the output of ranking and optimization component 204. Filters 600 and 604 can each be selectively activated or deactivated.

Relationships between data elements may be computed by server 100 via combinations of offline and online processing. The offline portion may pre-compute the overall relationships between known and previously-observed user and/or item data elements to generate a generic representation of a specific customer's ecosystem (i.e. users and/or content/products). The generic representation is published to a model store (e.g. model store 884 in the embodiment of FIG. 8), and various metadata about the representation is published to a parameter store (e.g. parameter store 855 in the embodiment of FIG. 8). This generic representation can then be used in the online portion, to calculate a specific response to a specific user request.

Figure 7:
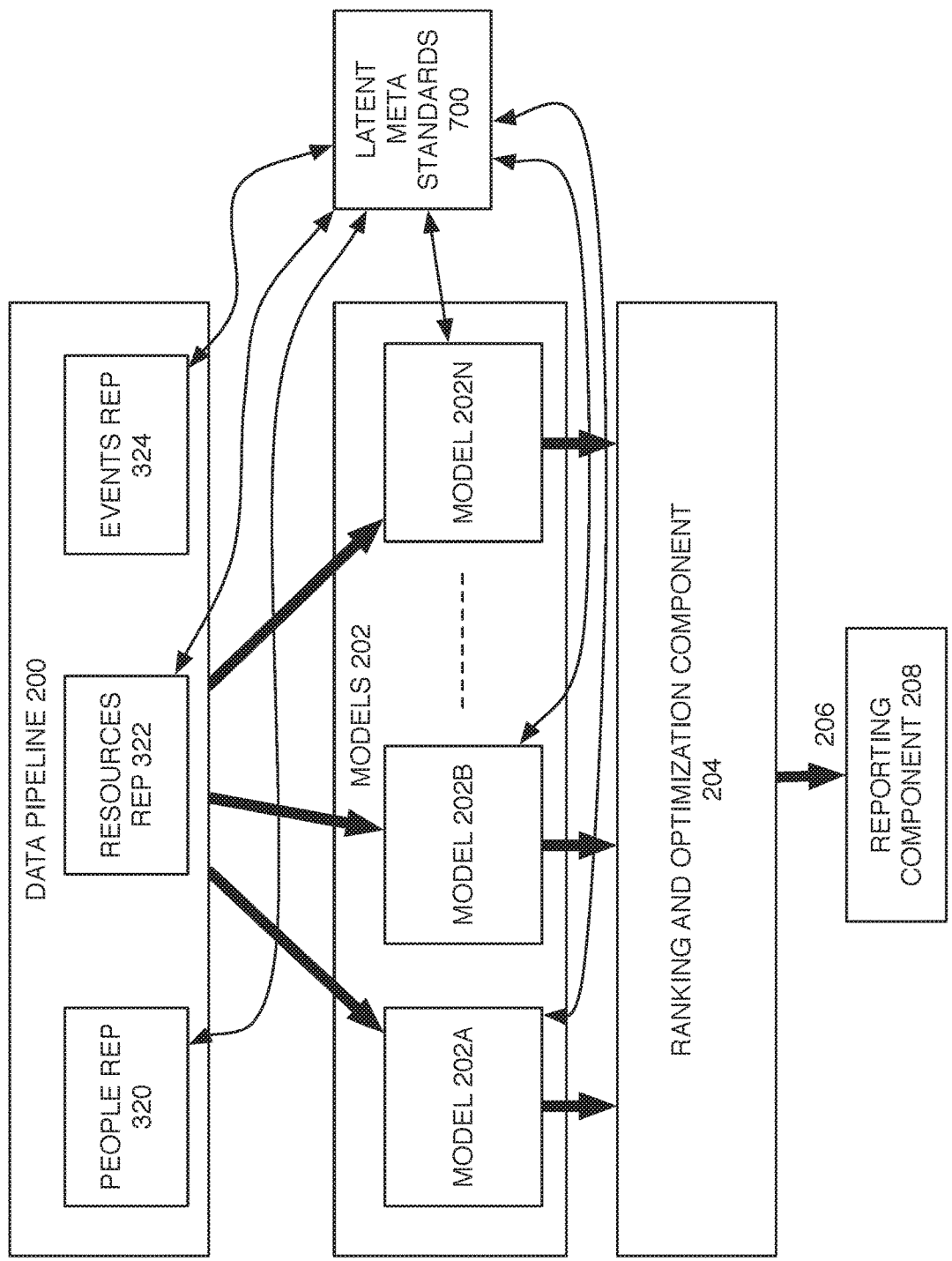
FIG. 7 is a schematic block diagram of another embodiment of a content personalization system.

In some circumstances, it may be desirable to precompute relationships between data elements offline. FIG. 7 illustrates another possible embodiment that precomputes relationships between data elements offline using a latent meta standards component. Latent meta standards component 700 provides data services to pre-compute and store relationships between data elements in repositories 320, 322 and 324, and make them available to models 202. Latent meta standards component 700 may be particularly useful for, e.g., pre-computing the probability that individuals will purchase item X after purchasing item Y, and storing the relationship pairs.

Latent meta standards component 700 may also be used to calculate, store and fetch latents, i.e. features or data points on an item. For example, a model evaluating textual similarity may group synonyms to reduce the feature set size, known in the field of machine learning techniques.

Learning Embodiment

Figure 8:
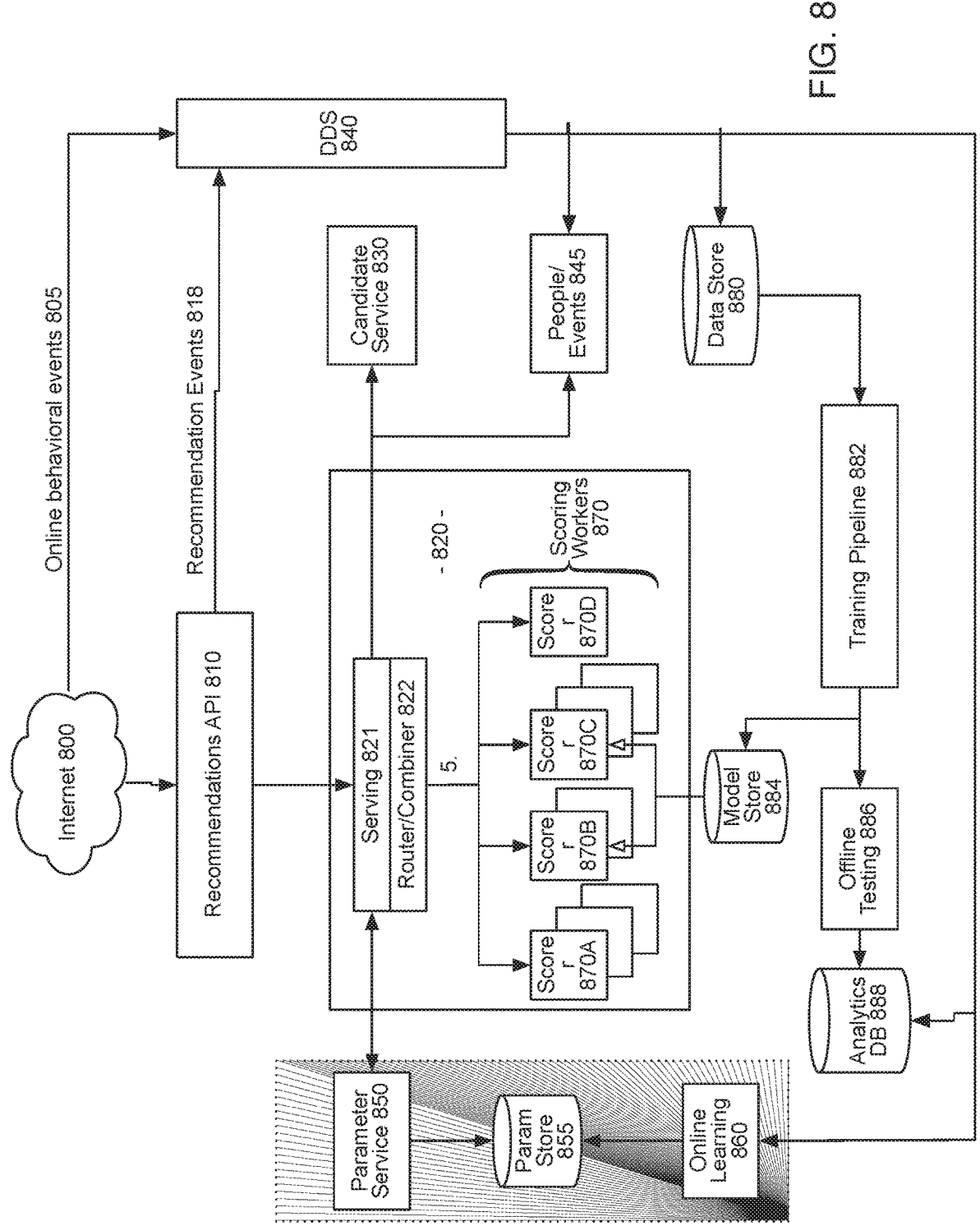
FIG. 8 is a schematic block diagram of a dynamic learning content personalization system.
Figure 9:
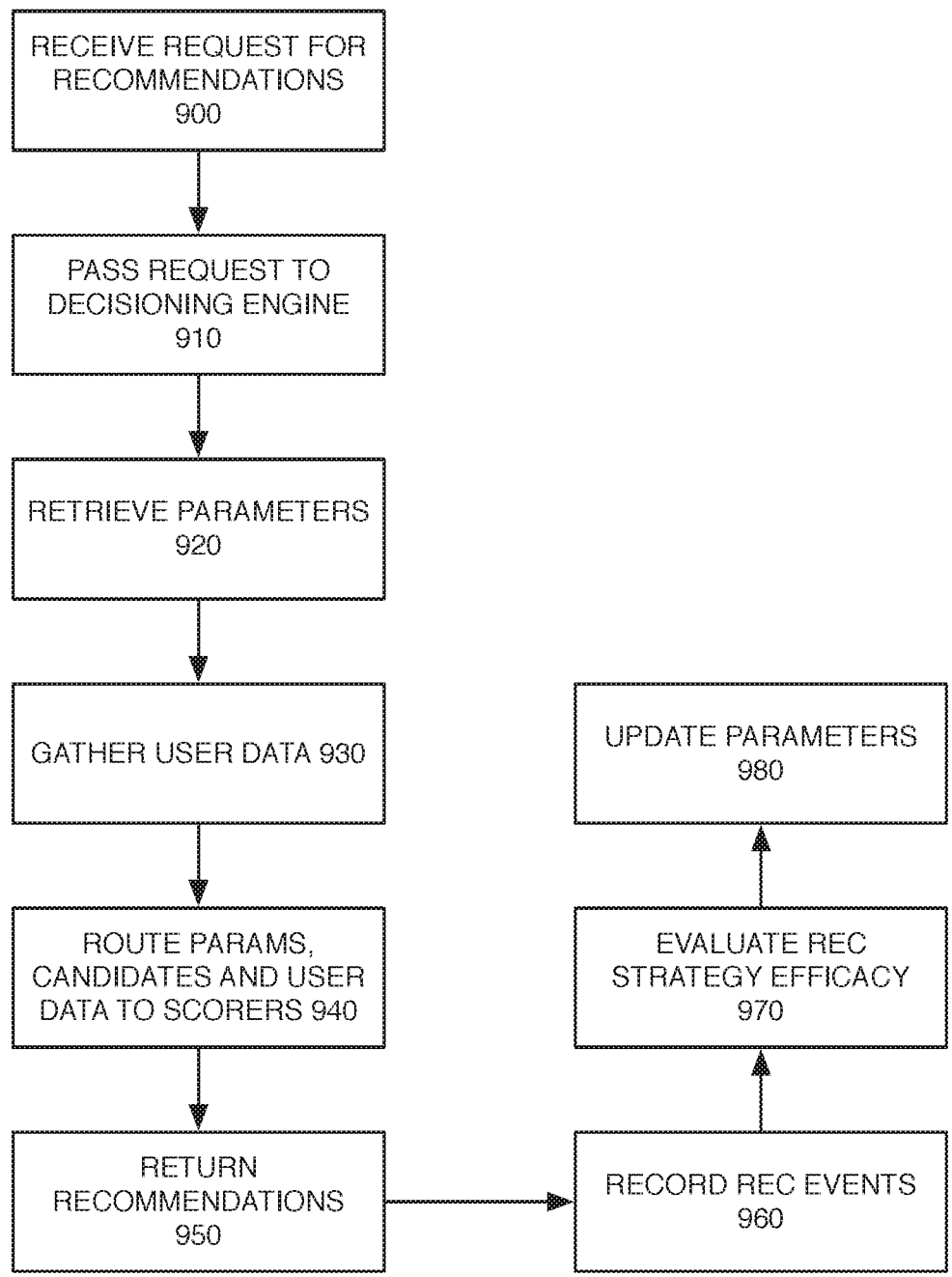
FIG. 9 is a process for utilizing the content personalization system of FIG. 8.

In some embodiments, it may be desirable to implement real-time learning functionality to continually optimize ensemble topology and parameterization, as well as stored parameters. FIG. 8 illustrates such an embodiment, implementing a process illustrated in FIG. 9.

In step 900, a request for recommendations comes in from a user 120 via Internet 800 (i.e. network 110) to external Recommendations API 810 (implemented via servers 100). The request contains the user's identity (e.g. a unique identifier, an email address or a customer-specific identifier), and real-time business rules that may need to be satisfied.

In step 910, the request is passed down to decisioning engine 820, implementing a real-time scoring platform. Serving component 821 is an asynchronous system preferably architected to handle many thousands of requests simultaneously. When a request comes in from API 810, serving component 821 starts a timer, setting a maximum time spent processing a request within recommendation service 820.

In step 920, serving component 821 retrieves parameters for the request from a parameter service 850 and parameter store 855. These parameters could include (but are not limited to): (a) recommendation strategy to use; (b) algorithm and strategy parameters; and (c) alternative strategies to use. Recommendation strategies may be a single algorithm or a particular ensemble mixture of algorithms, along with learned weightings and other parameters. Parameters are allocated either via a random allocation based on a probability distribution, or a hash-based allocation based on the users unique identifier.

In step 930, serving component 821 gathers other data for the requesting user. A set of candidates (recommendable resources) that obey the customer's global business rules and also their request-specific business rules that were passed in step 900 above are gathered from candidate service 830. These candidates can contain information about users' interactions with them, and other intrinsic information such as (but not limited to) creation and update times and behavioral segment affinities; all of which can be used to order or filter the potential candidates. Other user data that may be gathered in step 930 includes user profiles and history for the user specified in the request, obtained from People/Events Data store 845. User profile data can contain (but is not limited to) demographic information, technographic information (browser/OS/email address/etc.), and business-specific account information (new users vs. existing users, users near some kind of subscription renewal, etc.).

In step 940, the combination of parameters, candidates and user data are passed to router component 822, which routes the data to a set of one or more scoring processes (scorers) 870. Specifically, router/combiner 822 looks up an addresses of required scorers 870, sends the request plus request data to the desired scorers 870, and handles the responses from all scorers 870.

Each scorer 870 generates a recommendation score, given the request and request data. The scorers 870 are typically specific to a single customer/model combination, though there may be multiple processes (workers) for each scorer. There may be many scorers for a single customer, each scorer representing a different model used to generate scores. Moreover, there may be many workers for a single customer/model combination if the processing load is high. A request can be routed to multiple scorers and the results combined or to a single scorer (which may also be an ensemble predictor in itself). Scorers will generate, for each candidate, relative or absolute scores based on the user's data, candidates' data, and parameters for the request, to allow for candidates to be ordered in a particular order according to the user's preference.

In step 950, the response from scorers 870 (i.e. the recommended resources) is then returned via router/combiner component 822, which blends the results of multiple scorers 870, e.g. as a cascading choice (choose the best one) or a weighted combination of the outputs. The combiner mechanism is also preferably implemented as an asynchronous system for handling many requests concurrently. The desired response is passed to API 810 via server 821, for return to the user.

As described above, a maximum response time may be monitored, e.g. by serving component 821, to ensure timely responses are provided. If the serving timer expires, router/combiner 822 may result the best results that have been identified by the time of timer expiration.

After the recommended resources are returned to the user, and potentially viewed by the user (email open or website/messenger recommendation view) and also potentially selected to consume/purchase by the user (article or video view, or product purchase, etc.), these actions are recorded by the system as recommendation events 815 (step 960). Using these events, along with information about the value of the resources interacted with by the user, an online learning system 860 can determine the relative efficacy of different recommendation strategies (step 970). The online learning system 860 will then, in real time, make updates to the parameters within parameter store 855, so that the next request that comes in may have a different set of parameter and/or strategies (step 980).

The online learning system 860 will allow for updates due to continuous update (e.g. through recommendations on a website) or via batch data update (as through an email blast or messenger broadcast). The online learning system 860 allows for many hundreds of separate business customers across different industry sectors to be optimized dynamically and automatically without human intervention.

The embodiment of FIG. 8 also includes distributed data stream 840. Distributed data stream 840 is used to collect all data from internal systems and the outside world, and can also be referred to as a distributed log and/or data pipeline. Distributed data store 880 maintains all output from data collection, in both raw and enriched forms. Training pipeline 882 implements an offline training system. Training pipeline 882 can be used to generate generic representations of customer ecosystems, as described further hereinabove. Training pipeline 882 implements functions including: (a) automatically generating models for the production systems; (b) publishing metadata about the models into the production system; (c) generating experimental models; and (d) controlling the operation of the offline testing component. The generic representations, or models, are published to model store 884 following the offline portion of computation. Model store 884 is preferably a distributed store that allows scorers to easily access the built products symbolically (e.g. "provide the latest version of a particular algorithm family X for customer Y").

Offline testing module 886 allows for testing of newly built models on either historical ("golden") data or via the output of a simulator. The historical or simulated data can be run against many different instantiations of the newly built model to determine optimal values for weights or other parameters without having to run on line traffic (hence keeping costs and risks down). Offline testing gets its inputs automatically from the training pipeline 882 (i.e. the models and parameters to test) and puts its outputs into analytics database 888. Analytics database 888 also receives data from data stream 840, and can power internal and external reports and allow analysis by data scientists and analysts.

While certain system infrastructure elements are illustrated in particular configurations, it is understood and contemplated that functional elements described herein can be readily integrated and/or implemented via various alternative hardware or software abstractions, as would be known to a person of skill in the field of information systems design. For example, while some of the above described embodiments include presentation of content via a web browser, it is contemplated and understood that a standalone PC application, or a smart phone or tablet computer app, could be implemented in order to present content as described hereinabove. These and other variations are contemplated.

Moreover, while certain embodiments of the invention have been described herein in detail for purposes of clarity and understanding, the foregoing description and Figures merely explain and illustrate the present invention and the present invention is not limited thereto. It will be appreciated that those skilled in the art, having the present disclosure before them, will be able to make modifications and variations to that disclosed herein without departing from the scope of any appended claims.

The invention claimed is:

1. A computer-implemented method for generating content recommendations for content items, each content item associated with one of a plurality of customers, the method comprising:
   receiving, by a network-connected server, a content request from a requesting user, the content request comprising a user identifier and a customer identifier;
   retrieving request parameters from a computer-implemented parameter service, the request parameters comprising indicia of a plurality of recommendation strategies, and parameters for said recommendation strategies;
   retrieving user data comprising a set of indicia of recommendable resources associated with the customer identifier;
   routing the content request, request parameters and user data to a plurality of computer-implemented scorers, each scorer generating a recommendation score for each recommendable resource;
   generating content recommendations based on the recommendation scores, which content recommendations are returned to the requesting user and stored by the server as a recommendation event within a repository of recommendation events;
   evaluating the relative efficacy of the one or more recommendation strategies by implementing an online learning system acting on data comprising recommendation event data and subsequent interactions of the requesting user with recommendable resources; and
   optimizing recommendation strategy efficacy by updating parameters within the parameter service based on the online learning system evaluation of relative efficacy.

2. The method of claim 1, wherein retrieving user data further comprises retrieving a set of recommendable resources associated with the customer identifier and compliant with business rules associated with the customer identifier.

3. The method of claim 1, wherein the user data further comprises data descriptive of prior interactions between the requesting user and the recommendable resources.

4. The method of claim 1, wherein the user data further comprises profile data associated with the requesting user.

5. The method of claim 1, wherein generating content recommendations based on the recommendation scores comprises generating an ordered output set of the recommendable resources indicia.

6. The method of claim 1, further comprising monitoring by the server an elapsed time since receipt of the content request, and wherein generating content recommendations further comprises, based on the elapsed time since receipt of the content request exceeding a threshold duration, generating content recommendations based on a subset of scorer outputs then-available.

7. A system, comprising:
   processors; and
   a memory storing instructions that, when executed by at least one processor among the processors, cause the system to perform operations comprising, at least:
   receiving, by a network-connected server, a content request from a requesting user, the content request comprising a user identifier and a customer identifier;
   retrieving request parameters from a computer-implemented parameter service, the request parameters comprising indicia of a plurality of recommendation strategies, and parameters for said recommendation strategies;
   retrieving user data comprising a set of indicia of recommendable resources associated with the customer identifier;
   routing the content request, request parameters and user data to a plurality of computer-implemented scorers, each scorer generating a recommendation score for each recommendable resource;
   generating content recommendations based on the recommendation scores, which content recommendations are returned to the requesting user and stored by the server as a recommendation event within a repository of recommendation events;
   evaluating the relative efficacy of the one or more recommendation strategies by implementing an online learning system acting on data comprising recommendation event data and subsequent interactions of the requesting user with recommendable resources; and
   optimizing recommendation strategy efficacy by updating parameters within the parameter service based on the online learning system evaluation of relative efficacy.

8. The system of claim 7, wherein retrieving user data further comprises retrieving a set of recommendable resources associated with the customer identifier and compliant with business rules associated with the customer identifier.

9. The system of claim 7, wherein the user data further comprises data descriptive of prior interactions between the requesting user and the recommendable resources.

10. The system of claim 7, wherein the user data further comprises profile data associated with the requesting user.

11. The system of claim 7, wherein generating content recommendations based on the recommendation scores comprises generating an ordered output set of the recommendable resources indicia.

12. The system of claim 7, wherein the operations further comprise monitoring by the server an elapsed time since receipt of the content request, and wherein generating content recommendations further comprises, based on the elapsed time since receipt of the content request exceeding a threshold duration, generating content recommendations based on a subset of scorer outputs then-available.

13. A non-transitory machine-readable medium comprising instructions which, when read by a machine, cause the machine to perform operations comprising, at least:

receiving, by a network-connected server, a content request from a requesting user, the content request comprising a user identifier and a customer identifier;

retrieving request parameters from a computer-implemented parameter service, the request parameters comprising indicia of a plurality of recommendation strategies, and parameters for said recommendation strategies;

retrieving user data comprising a set of indicia of recommendable resources associated with the customer identifier;

routing the content request, request parameters and user data to a plurality of computer-implemented scorers, each scorer generating a recommendation score for each recommendable resource;

generating content recommendations based on the recommendation scores, which content recommendations are returned to the requesting user and stored by the server as a recommendation event within a repository of recommendation events;

evaluating the relative efficacy of the one or more recommendation strategies by implementing an online learning system acting on data comprising recommendation event data and subsequent interactions of the requesting user with recommendable resources; and optimizing recommendation strategy efficacy by updating parameters within the parameter service based on the online learning system evaluation of relative efficacy.

14. The medium of claim 13, wherein retrieving user data further comprises retrieving a set of recommendable resources associated with the customer identifier and compliant with business rules associated with the customer identifier.

15. The medium of claim 13, wherein the user data further comprises data descriptive of prior interactions between the requesting user and the recommendable resources.

16. The medium of claim 13, wherein the user data further comprises profile data associated with the requesting user.

17. The medium of claim 13, wherein generating content recommendations based on the recommendation scores comprises generating an ordered output set of the recommendable resources indicia.

18. The medium of claim 13, wherein the operations further comprise monitoring by the server an elapsed time since receipt of the content request, and wherein generating content recommendations further comprises, based on the elapsed time since receipt of the content request exceeding a threshold duration, generating content recommendations based on a subset of scorer outputs then-available.

* * * * *